United States Patent
Lee et al.

(10) Patent No.: US 9,183,840 B2
(45) Date of Patent: Nov. 10, 2015

(54) APPARATUS AND METHOD FOR MEASURING QUALITY OF AUDIO

(71) Applicant: Electronics and Telecommunications Research Institute, Daejeon (KR)

(72) Inventors: Seung-Jae Lee, Daejeon (KR); Jung-Hyun Kim, Daejeon (KR); Won-Young Yoo, Daejeon (KR); Yong-Seok Seo, Deajeon (KR); Sang-Kwang Lee, Daejeon (KR); Jee-Hyun Park, Daejeon (KR); Young-Suk Yoon, Chungcheongbuk-do (KR); Young-Ho Suh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 243 days.

(21) Appl. No.: 13/918,458

(22) Filed: Jun. 14, 2013

(65) Prior Publication Data

US 2014/0016789 A1    Jan. 16, 2014

(30) Foreign Application Priority Data

Jul. 11, 2012    (KR) .......................... 10-2012-0075371

(51) Int. Cl.
| | |
|---|---|
| H04R 29/00 | (2006.01) |
| G10L 19/018 | (2013.01) |
| G10L 25/69 | (2013.01) |
| G06F 17/30 | (2006.01) |
| G10L 25/18 | (2013.01) |

(52) U.S. Cl.
CPC ........ G10L 19/018 (2013.01); G06F 17/30743 (2013.01); G10L 25/69 (2013.01); G10L 25/18 (2013.01)

(58) Field of Classification Search
CPC ........... G01H 3/14; G10L 15/10; G10L 15/08
USPC .............. 381/56; 704/270, 239, 236–237
See application file for complete search history.

(56) References Cited

U.S. PATENT DOCUMENTS

| | | |
|---|---|---|
| 6,990,453 B2 | 1/2006 | Wang et al. |
| 8,989,395 B2 * | 3/2015 | Kruglick .......................... 381/56 |
| 2012/0054238 A1 | 3/2012 | Lee et al. |

(Continued)

FOREIGN PATENT DOCUMENTS

KR    10-2012-0021174 A    3/2012

OTHER PUBLICATIONS

Peter Jan O. Doets et al., "Distortion Estimation in Compressed Music Using Only Audio Fingerprints," IEEE Transactions on Audio, Speech, and Language Processing, Feb. 2008, pp. 302-317, vol. 16, No. 2, IEEE.

*Primary Examiner* — Disler Paul

(57) ABSTRACT

Disclosed herein is an apparatus and method for measuring quality of audio. The apparatus includes a distorted signal generation unit, an extraction unit, a distortion level measurement unit, a distortion function generation unit, and a search and measurement unit. The distorted signal generation unit generates a plurality of distorted signals with respect to audio in compliance. The extraction unit extracts a fingerprint and AV information corresponding to the audio and fingerprints and AV information corresponding to the plurality of distorted signals. The distortion level measurement unit measures fingerprint distance differences, and arousal and valence (AV) distance differences. The distortion function generation unit generates a fingerprint distortion function and an AV distortion function. The search and measurement unit measures the quality of the audio by extracting a fingerprint and AV information from query audio and then comparing extraction results with the fingerprint distortion function or AV distortion function.

10 Claims, 4 Drawing Sheets

(56) References Cited

U.S. PATENT DOCUMENTS

| | | | |
|---|---|---|---|
| 2012/0140935 A1* | 6/2012 | Kruglick | 381/56 |
| 2012/0209612 A1* | 8/2012 | Bilobrov | 704/270 |
| 2014/0172429 A1* | 6/2014 | Butcher et al. | 704/270 |
| 2014/0307878 A1* | 10/2014 | Osborne et al. | 381/56 |

* cited by examiner

APPARATUS AND METHOD FOR MEASURING QUALITY OF AUDIO

CROSS REFERENCE TO RELATED APPLICATION

This application claims the benefit of Korean Patent Application No. 10-2012-0075371, filed on Jul. 11, 2012, which is hereby incorporated by reference in its entirety into this application.

BACKGROUND OF THE INVENTION

1. Technical Field

The present invention relates generally to an apparatus and method for measuring the quality of audio and, more particularly, to an apparatus and method for measuring the quality of audio using fingerprints and arousal and valence (AV) information.

2. Description of the Related Art

Audio is sound that is output, for example, from a radio receiver or a television set. The measurement of the quality of such audio is essential for compressing the audio, mitigating the noise of a signal corresponding to the audio, or measuring the imperceptibility of audio watermarking.

In general, methods of evaluating the quality of audio may be divided into subjective evaluation methods and objective evaluation methods. The subjective evaluation methods have the disadvantage of being affected by the emotional state of a human who participates in the measurement of the quality of audio, an environmental factor and the like, and the disadvantage of requiring a long period of time and much effort.

Currently, for the above reasons, research into objective methods of evaluating the quality of audio has been conducted.

International Telecommunication Union-R (ITU-R) corresponding to a communication protocol for the radio frequency band publishes 1387, which is a recommendation for a method of evaluating the quality of an audio codec, which is known as Perceptual Evacuation of Audio Quality (PEAQ). However, this objective method of evaluating the quality of audio lacks consideration of the variation of audio over time and a multi-channel, and thus various alternatives have been proposed.

U.S. Pat. No. 6,990,453 discloses a technology that identifies an audio sample using a fingerprint representative of the feature of a specific location of a media file affixed with a database index.

Furthermore, Korean Patent Application Publication No. 2012-0021174 discloses a technology that searches music using an emotion model that is generated based on the similarity between emotion types.

However, the above conventional methods of evaluating the quality of audio have the disadvantage of always requiring original audio as an input. Therefore, when a large-scale test is conducted or there is no reference audio or no audio information, it is difficult to measure the quality of audio.

As a result, there is a need for a method of evaluating the quality of audio using Arousal and Valence (AV) values that are acquired from audio fingerprints and an emotion model that is used for audio search.

SUMMARY OF THE INVENTION

Accordingly, the present invention has been made keeping in mind the above problems occurring in the prior art, and an object of the present invention is to provide an apparatus and method for measuring the quality of audio using fingerprints and AV information.

In accordance with an aspect of the present invention, there is provided an apparatus for measuring quality of audio, including a distorted signal generation unit configured to generate a plurality of distorted signals with respect to audio in compliance with preset distortion standards; an extraction unit configured to extract a fingerprint and AV information corresponding to the audio and fingerprints and AV information corresponding to the plurality of distorted signals; a distortion level measurement unit configured to measure fingerprint distance differences between the fingerprint corresponding to the audio and the fingerprints corresponding to the plurality of distorted signals, and arousal and valence (AV) distance differences between the AV information corresponding to the audio and the AV information corresponding to the plurality of distorted signals; a distortion function generation unit configured to generate a fingerprint distortion function and an AV distortion function based on a distribution corresponding to the distance differences between the fingerprints and a distribution corresponding to the AV distance differences; and a search and measurement unit configured to measure quality of the audio by extracting a fingerprint and AV information from query audio and then comparing extraction results with the fingerprint distortion function or AV distortion function.

The extraction unit may extract the fingerprints using an extraction technique that corresponds to one of a normalized spectral subband centroid (NSSC), subband energy differences, and a spectral flatness measure (SFM).

The extraction unit may extract the AV information based on identification information that the audio includes, and extract the AV information based on identification information that the plurality of distorted signals includes.

The AV information may include arousal and valence.

The search and measurement unit may include an extraction unit configured to extract the fingerprint and the AV information from the query audio; a search and synchronization unit configured to search for audio corresponding to the query audio in a database using the fingerprint and the AV information extracted from the query audio, and to synchronize a fingerprint in the database with the fingerprint corresponding to the query audio; and a quality measurement unit configured to measure quality of the audio by comparing a fingerprint distortion function or an AV distortion function corresponding to the audio found by the search and synchronization unit with a fingerprint distortion function or an AV distortion function corresponding to the query audio.

In accordance with an aspect of the present invention, there is provided a method of measuring quality of audio, including generating a plurality of distorted signals with respect to audio in compliance with preset distortion standards; extracting a fingerprint and AV information corresponding to the audio and fingerprints and AV information corresponding to the plurality of distorted signals; measuring fingerprint distance differences between the fingerprint corresponding to the audio and the fingerprints corresponding to the plurality of distorted signals, and AV distance differences between the AV information corresponding to the audio and the AV information corresponding to the plurality of distorted signals; generating a fingerprint distortion function and an AV distortion function based on a distribution corresponding to the distance differences between the fingerprints and a distribution corresponding to the AV distance differences; and measuring quality of the audio by extracting a fingerprint and AV information from query audio and then comparing extraction results with the fingerprint distortion function or AV distortion function.

The extracting may include extracting the fingerprints using an extraction technique that corresponds to one of an NSSC, subband energy differences, and an SFM.

The extracting may include extracting the AV information based on identification information that the audio includes and extracting the AV information based on identification information that the plurality of distorted signals includes.

The AV information may include arousal and valence.

The measuring quality of the audio may include extracting the fingerprint and the AV information from the query audio; searching for audio corresponding to the query audio in a database using the fingerprint and the AV information extracted from the query audio; synchronizing a fingerprint in the database with the fingerprint corresponding to the query audio; and measuring quality of the audio by comparing a fingerprint distortion function or an AV distortion function corresponding to the found audio with a fingerprint distortion function or an AV distortion function corresponding to the query audio.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
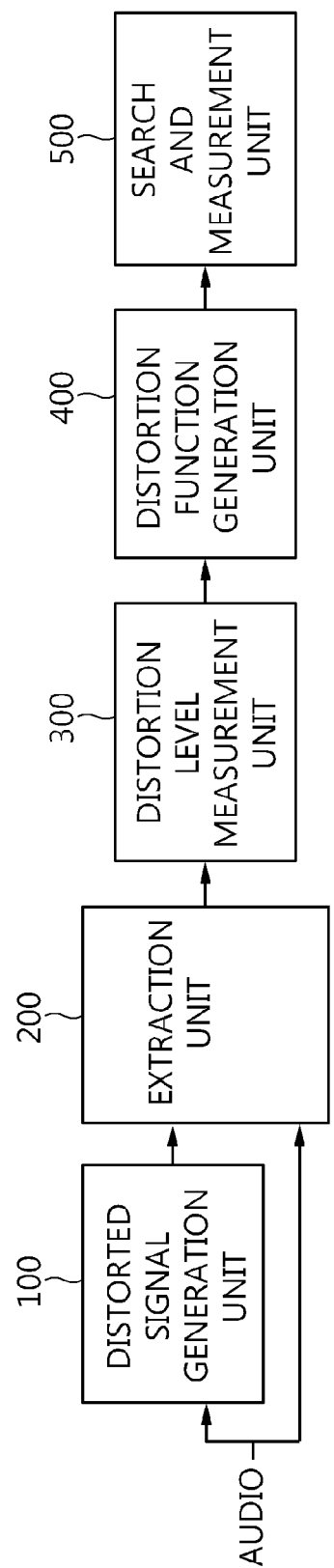
FIG. 1 is a block diagram illustrating an apparatus for measuring the quality of audio according to an embodiment of the present invention.

The present invention will be described in detail below with reference to the accompanying drawings. Repeated descriptions and descriptions of known functions and configurations which have been deemed to make the gist of the present invention unnecessarily vague will be omitted below. The embodiments of the present invention are intended to fully describe the present invention to a person having ordinary knowledge in the art. Accordingly, the shapes, sizes, etc. of elements in the drawings may be exaggerated to make the description clear.

An apparatus and method for measuring the quality of audio in accordance with embodiments of the present invention will be described in detail below with reference to the accompanying drawings.

FIG. 1 is a block diagram illustrating an apparatus for measuring the quality of audio according to an embodiment of the present invention.

Referring to FIG. 1, the apparatus for measuring the quality of audio includes a distorted signal generation unit 100, an extraction unit 200, a distortion level measurement unit 300, a distortion function generation unit 400, and a search and measurement unit 500.

The distorted signal generation unit 100 generates a plurality of distorted signals in compliance with preset distortion standards with respect to an input signal, that is, audio. For example, if a corresponding distortion standard is related to MP3 compression, the distorted signal generation unit 100 generates various distorted signals of bit rates in the range of 256 kbps to 32 kbps in compliance with the distortion standard with respect to audio of 320 kbps.

The extraction unit 200 extracts fingerprints and AV information corresponding to the audio and the plurality of distorted signals.

Here, the term "fingerprint" refers to data capable of describing the features of audio data. A fingerprint is generated by analyzing audio data using one of various methods, such as frequency conversion, and may be used to determine whether audio data has been illegitimately reproduced or to search audio data using an audio fingerprint.

More specifically, the extraction unit 200 extracts fingerprints from the audio and the plurality of distorted signals using a preset extraction technique. For example, the extraction unit 200 extracts fingerprints using an extraction technique that corresponds to one of a normalized spectral subband centroid (NSSC), subband energy differences, and a spectral flatness measure (SFM).

Furthermore, the extraction unit 200 extracts AV information including arousal and valence based on identification information that each of the audio and the plurality of distorted signals includes. Here, the identification information corresponds to information that is used to identify a user's specific emotion type.

More specifically, the extraction unit 200 generates emotion classification models in which similar emotion types have been classified into each group using, for example, a distribution matrix in which emotion types exhibited by a human in response to the audio and the plurality of distorted signals have been represented by a matrix, and extracts arousal and valence corresponding to the AV information using each of the emotion classification models.

The distortion level measurement unit 300 measures the distance differences between the fingerprint corresponding to the audio and the fingerprints corresponding to the plurality of distorted signals. Furthermore, the distortion level measurement unit 300 measures the AV distance differences between the AV information corresponding to the audio and the AV information corresponding to the plurality of distorted signals. Here, although the distance according to this embodiment of the present invention may be Euclidean distance, it is not limited thereto.

For example, when the extraction unit 200 extracts 10 fingerprints per second, 100 fingerprints are extracted if a comparison target clip is 10 seconds long. Then the distortion level measurement unit 300 compares the values with the audio and the plurality of distorted signals, and measures the distance differences between the fingerprints for the overall audio at intervals of 10 seconds.

The distortion function generation unit 400 generates a fingerprint distortion function and an AV distortion function based on distributions corresponding to the distance differences between the fingerprints and the AV distance differences. For example, the distortion function generation unit 400 may generate the fingerprint distortion function as a Gaussian function using an average and a variance corresponding to the distance differences between the fingerprints.

According to this embodiment of the present invention, the distortion function generation unit 400 performs mapping to audio corresponding to the fingerprint distortion function and the AV distortion function, and then stores mapping results in a database (not illustrated). Here, the database contains not only the mapping results but also the fingerprint distortion function, the AV distortion function, the fingerprints, the AV information, etc.

The search and measurement unit 500 extracts a fingerprint and AV information from query audio, and searches for audio based on extraction results. Furthermore, the search and measurement unit 500 measures the quality of the audio by comparing the extraction results with the distribution of a distortion model, that is, the fingerprint distortion function or AV distortion function.

Next, the search and measurement unit 500 will be described in detail with reference to FIG. 2.

Figure 2:
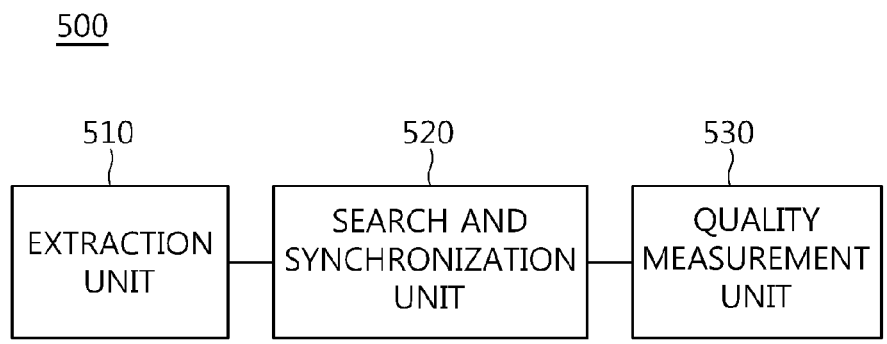
FIG. 2 is a block diagram illustrating a search and measurement unit according to the embodiment of the present invention.

FIG. 2 is a block diagram illustrating the search and measurement unit 500 according to this embodiment of the present invention.

Referring to FIG. 2, the search and measurement unit 500 includes an extraction unit 510, a search and synchronization unit 520, and a quality measurement unit 530.

The extraction unit 510 extracts a fingerprint and AV information from query audio.

The search and synchronization unit 520 searches for a corresponding audio in the database using the fingerprint and the AV information extracted from the query audio, and synchronizes the fingerprint inside the database with the fingerprint corresponding to the query audio. The search and synchronization unit 520 can increase the accuracy of a fingerprint distortion function, that is, a distortion model, by synchronizing the fingerprint inside the database with the fingerprint corresponding to the query audio.

The quality measurement unit 530 measures the quality of the audio by comparing a fingerprint distortion function or an AV distortion function corresponding to the found audio with a fingerprint distortion function or an AV distortion function corresponding to the query audio.

For example, the fingerprint distortion function or AV distortion function, that is, the distribution of the distortion model, will be described in detail with reference to FIGS. 3 and 4.

Figure 3:
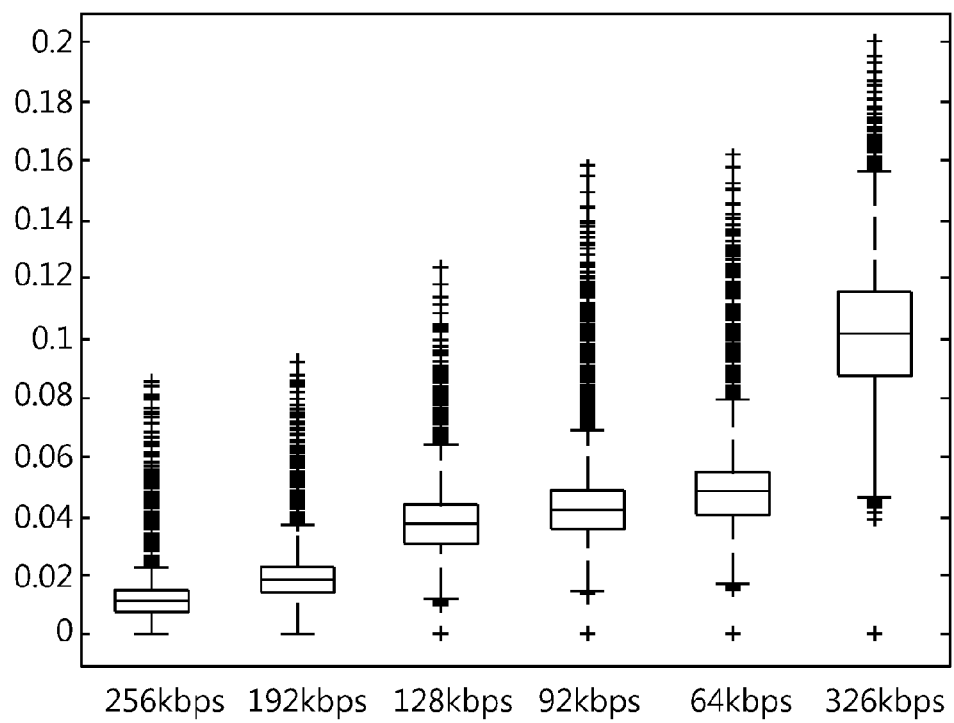
FIGS. 3 and 4 are graphs illustrating the distributions of distortion models according to an embodiment of the present invention.
Figure 4:
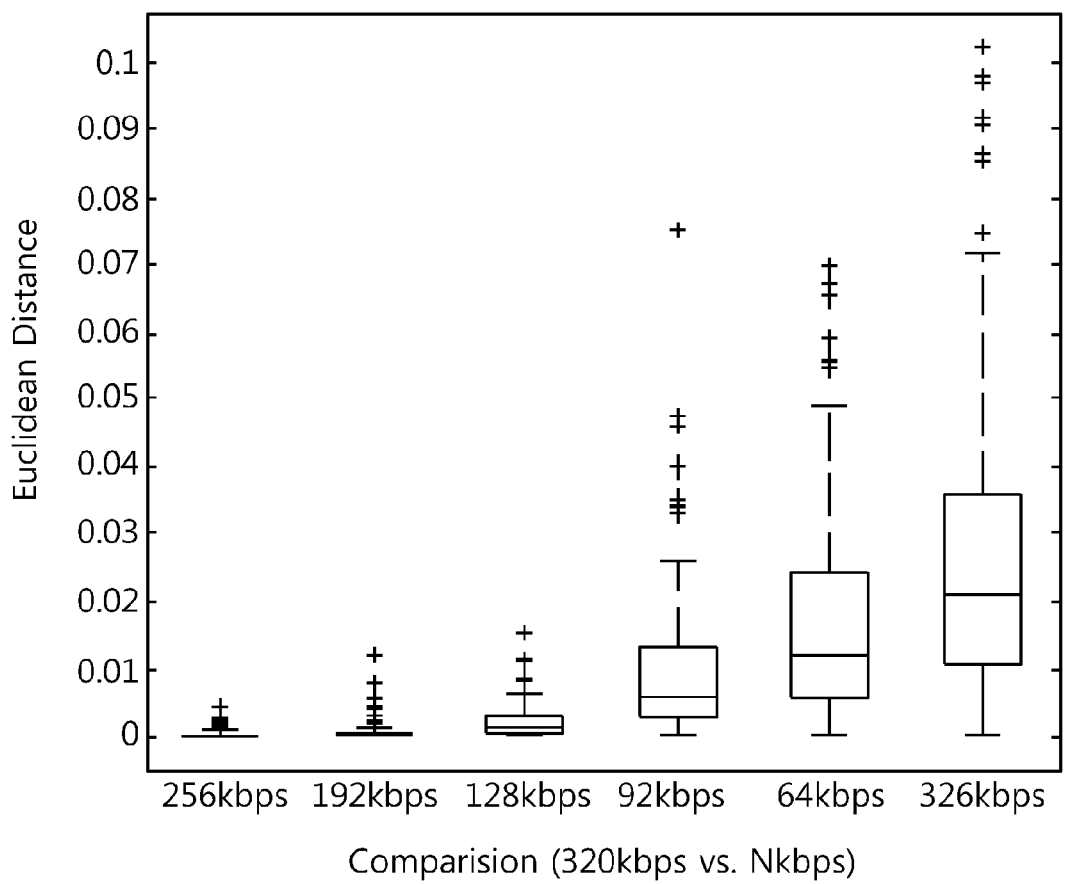

FIGS. 3 and 4 are graphs illustrating the distributions of distortion models according to an embodiment of the present invention.

FIG. 3 illustrates the distance differences between the fingerprints (320 kbps vs. N kbps) based on the MP3 compression ratio according to an NSSC, which is one of fingerprint extraction techniques. The present invention can primarily predict the distortion of audio using the distribution of the distortion model, such as that illustrated in FIG. 3.

FIG. 4 illustrates the AV distance differences based on the MP3 compression ratio corresponding to AV information.

Referring to FIGS. 3 and 4, it can be seen that the distance differences between the fingerprints significantly increase at 128 kbps and 64 kbps, whereas the AV distance differences gradually increase. As described above, the present invention can measure the quality of audio that was difficult to distinguish due to a high variance value in the past.

Next, the method of measuring the quality of audio will be described in detail with reference to FIG. 5.

Figure 5:
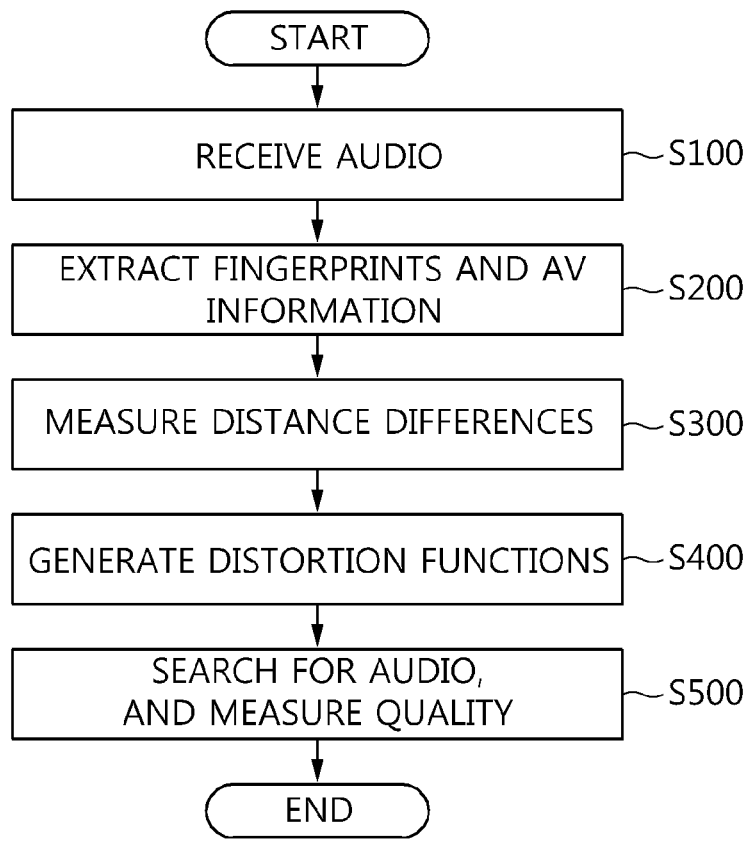
FIG. 5 is a flowchart illustrating a method of measuring the quality of audio according to an embodiment of the present invention.

FIG. 5 is a flowchart illustrating a method of measuring the quality of audio according to an embodiment of the present invention.

Referring to FIG. 5, the apparatus for measuring the quality of audio receives an input signal, that is, audio, from the outside at step 100.

The apparatus for measuring the quality of audio extracts a fingerprint and AV information corresponding to the audio from the audio at step 200.

More specifically, the apparatus for measuring the quality of audio extracts the fingerprint using an extraction technique that corresponds to one of an NSSC, subband energy differences, and an SFM.

Furthermore, the apparatus for measuring the quality of audio generates emotion classification models in which similar emotion types have been classified into each group using, for example, a distribution matrix in which emotion types exhibited by a human in response to the audio and the plurality of distorted signals have been represented by a matrix, and extracts arousal and valence corresponding to the AV information using each of the emotion classification models.

The apparatus for measuring the quality of audio measures the distance differences between the fingerprint corresponding to the audio and the fingerprints corresponding to the plurality of distorted signals, and measures the AV distance differences between the AV information corresponding to the audio and the AV information corresponding to the plurality of distorted signals at step 300.

The apparatus for measuring the quality of audio generates a fingerprint distortion function and an AV distortion function based on distributions corresponding to the distance differences between the fingerprints and the AV distance differences at step 400.

The apparatus for measuring the quality of audio extracts a fingerprint and AV information from query audio, searches for audio based on extraction results, and measures the quality of the audio by comparing the extraction results with the distribution of a distortion model, that is, the fingerprint distortion function or AV distortion function at step 500.

In accordance with the present invention, the apparatus and method for measuring the quality of audio measure the quality of audio using fingerprints and AV information, thereby objectively evaluating the quality of the audio by applying a distortion model.

Furthermore, the apparatus and method for measuring the quality of audio can eliminate the disadvantage of requiring original audio as an input in order to measure the quality of audio, and also can search for audio and measure the quality of the audio simultaneously.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for measuring quality of audio, comprising:
   a storage; and
   a processor configured to:
   generate a plurality of distorted signals with respect to the audio in compliance with preset distortion standards;
   extract a fingerprint and arousal and valence (AV) information corresponding to the audio;
   extract fingerprints and AV information corresponding to the plurality of distorted signals;
   measure fingerprint distance differences between the fingerprint corresponding to the audio and the fingerprints corresponding to the plurality of distorted signals;
   measure AV distance differences between the AV information corresponding to the audio and the AV information corresponding to the plurality of distorted signals;
   generate a fingerprint distortion function and an AV distortion function based on a distribution corresponding to the fingerprint distance differences and a distribution corresponding to the AV distance differences, the fingerprint distortion function and the AV distortion function being stored in the storage; and measure the quality of the audio by extracting a fingerprint and AV information from query audio and then comparing extraction results with the fingerprint distortion function or AV distortion function.

2. The apparatus of claim 1, wherein a fingerprint is extracted using an extraction technique that corresponds to one of a normalized spectral subband centroid (NSSC), subband energy differences, and a spectral flatness measure (SFM).

3. The apparatus of claim 1, wherein the AV information corresponding to the audio is extracted based on identification information that the audio includes, and the AV information corresponding to the plurality of distorted signals is extracted based on identification information that the plurality of distorted signals includes.

4. The apparatus of claim 3, wherein the AV information includes arousal and valence.

5. The apparatus of claim 1, wherein measuring the quality of the audio includes:
extracting the fingerprint and the AV information from the query audio;
searching for audio corresponding to the query audio in a database using the fingerprint and the AV information extracted from the query audio, and synchronizing a fingerprint in the database with the fingerprint corresponding to the query audio; and
measuring the quality of the audio by comparing a fingerprint distortion function or an AV distortion function corresponding to the audio found by the searching and synchronizing steps with a fingerprint distortion function or an AV distortion function corresponding to the query audio, respectively.

6. A method of measuring quality of audio, comprising:
generating a plurality of distorted signals with respect to the audio in compliance with preset distortion standards;
extracting a fingerprint and AV information corresponding to the audio;
extracting fingerprints and AV information corresponding to the plurality of distorted signals;
measuring fingerprint distance differences between the fingerprint corresponding to the audio and the fingerprints corresponding to the plurality of distorted signals;
measuring AV distance differences between the AV information corresponding to the audio and the AV information corresponding to the plurality of distorted signals;
generating a fingerprint distortion function and an AV distortion function based on a distribution corresponding to the fingerprint distance differences and a distribution corresponding to the AV distance differences; and
measuring quality of the audio by extracting a fingerprint and AV information from query audio and then comparing extraction results with the fingerprint distortion function or the AV distortion function.

7. The method of claim 6, wherein a fingerprint is extracted using an extraction technique that corresponds to one of an NSSC, subband energy differences, and an SFM.

8. The method of claim 6, wherein the AV information corresponding to the audio is extracted based on identification information that the audio includes, and the AV information corresponding to the plurality of distorted signals is extracted based on identification information that the plurality of distorted signals includes.

9. The method of claim 8, wherein the AV information includes arousal and valence.

10. The method of claim 6, wherein the measuring quality of the audio includes:
extracting the fingerprint and the AV information from the query audio;
searching for audio corresponding to the query audio in a database using the fingerprint and the AV information extracted from the query audio;
synchronizing a fingerprint in the database with the fingerprint corresponding to the query audio; and
measuring the quality of the audio by comparing a fingerprint distortion function or an AV distortion function corresponding to the audio found by the searching and synchronizing steps with a fingerprint distortion function or an AV distortion function corresponding to the query audio, respectively.

* * * * *